US012793129B2

(12) United States Patent
Nagla

(10) Patent No.: US 12,793,129 B2
(45) Date of Patent: Nov. 10, 2026

(54) SYSTEM AND METHOD FOR DYNAMIC MONITORING OF CREDIT PARAMETERS

(71) Applicant: Royal Bank of Canada, Montreal (CA)

(72) Inventor: Gaurav Nagla, Oakville (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 15/388,688

(22) Filed: Dec. 22, 2016

(65) Prior Publication Data

US 2017/0186085 A1 Jun. 29, 2017

Related U.S. Application Data

(60) Provisional application No. 62/387,272, filed on Dec. 23, 2015.

(51) Int. Cl.
*G06Q 40/03* (2023.01)

(52) U.S. Cl.
CPC .................................... *G06Q 40/03* (2023.01)

(58) Field of Classification Search
CPC ............................... G06Q 40/00; G06Q 40/06
See application file for complete search history.

(56) References Cited

U.S. PATENT DOCUMENTS

| | | | | |
|---|---|---|---|---|
| 7,630,932 | B2 * | 12/2009 | Danaher | G06Q 40/02 705/37 |
| 8,266,053 | B2 * | 9/2012 | Crawford | G06Q 40/00 705/35 |
| 8,775,291 | B1 * | 7/2014 | Mellman | G06Q 40/00 705/36 R |
| 10,019,757 | B2 * | 7/2018 | Choudhuri | G06Q 40/00 705/35 |
| 2001/0014877 | A1 * | 8/2001 | Defrancesco, Jr. | G06Q 10/10 705/38 |
| 2005/0137904 | A1 * | 6/2005 | Lane | G06Q 50/16 707/E17.112 |
| 2006/0116952 | A1 * | 6/2006 | Orfano | G06Q 40/02 705/38 |
| 2006/0224480 | A1 * | 10/2006 | Bent | G06Q 40/00 705/35 |
| 2007/0027799 | A1 * | 2/2007 | Manelis | G06Q 40/00 705/38 |
| 2007/0156576 | A1 * | 7/2007 | Imrey | G06Q 40/00 705/38 |

(Continued)

FOREIGN PATENT DOCUMENTS

WO WO-2013075174 A2 * 5/2013 ............. G06Q 40/06

OTHER PUBLICATIONS

CIPO, Office Action dated Feb. 20, 2023 received in Canadian Patent Application No. 2952874.
Office Action dated Nov. 10, 2023 issued in CA 2,952,874.

*Primary Examiner* — Steven G. S. Sanghera
*Assistant Examiner* — Pierre L Maccagno
(74) *Attorney, Agent, or Firm* — Norton Rose Fulbright Canada LLP

(57) ABSTRACT

In some embodiments, various systems, methods, and/or computer-readable media may be provided in relation to automated asset financing, and more particularly, systems, methods, and/or computer-readable media for electronically provisioning a flexible loan (or loans) in relation to an asset.

19 Claims, 6 Drawing Sheets

(56) References Cited

U.S. PATENT DOCUMENTS

| | | | | |
|---|---|---|---|---|
| 2008/0249809 | A1 * | 10/2008 | Rosen | G06Q 40/00 705/4 |
| 2012/0254045 | A1 * | 10/2012 | Orfano | G06Q 30/06 705/306 |
| 2014/0025562 | A1 * | 1/2014 | Rothrock | G06Q 40/03 705/38 |
| 2014/0201060 | A1 * | 7/2014 | Rice | G06Q 40/025 705/38 |
| 2014/0249992 | A1 * | 9/2014 | Schmidt | G06Q 40/03 705/38 |
| 2014/0310151 | A1 * | 10/2014 | Shishkov | G06Q 40/025 705/38 |
| 2014/0351167 | A1 * | 11/2014 | Clements | G06Q 40/06 705/36 R |
| 2015/0066739 | A1 * | 3/2015 | Lucas, Jr. | G06Q 40/025 705/38 |
| 2017/0186085 | A1 * | 6/2017 | Nagla | G06Q 40/03 |
| 2020/0175587 | A1 * | 6/2020 | Leonard | G06F 16/93 |

* cited by examiner

SYSTEM AND METHOD FOR DYNAMIC MONITORING OF CREDIT PARAMETERS

CROSS-REFERENCE TO RELATED APPLICATIONS

This application claims benefit, including priority, of U.S. Provisional No. 62/387,272, having a filing date of Dec. 23, 2015, incorporated herein by reference.

FIELD

Aspects of the present disclosure relate to handling data communications, and in specific embodiments in the field of automated asset financing, and more particularly, systems, methods, and/or non-transitory computer readable media for electronically provisioning a flexible loan in relation to an asset purchase.

INTRODUCTION

In the context of electronically provisioning a flexible loan (or loans) in relation to an asset purchase, there may be various challenges encountered, for example: determining appropriate characteristics of the loan(s) may require a non-trivial solution such that the characteristics match the particular contexts of the loan(s); technical implementation in regards to facilitating the transaction(s); ensuring that security interests are properly registered, recorded, and/or perfected, and management overhead required to track, monitor, and/or manage the loan(s).

Accordingly, a solution may be desirable that addresses some or more of the above challenges, and/or other challenges.

SUMMARY

In accordance with an aspect, there is provided a system for dynamic monitoring of credit parameters, the system including: at least one communication interface; at least one storage device configured to store a plurality of data records; at least one processor configured for: receiving over the at least one communication interface signals representing a first credit amount associated with an account profile record, the account profile record defining a base credit rate and a total credit limit; generating a first data record defining credit parameters, the credit parameters including a principal parameter populated with the first credit amount, and a credit rate parameter populated with the base credit rate; storing the first data record in the at least one storage device; receiving a registration request associated with the account profile record, the registration request including asset data identifying an asset to be registered against at least a portion of the first credit amount; correlating at least a portion of the account profile record and the asset data with one or more database records accessed over the at least one communication interface, the one or more database records including ownership or security interest information for a plurality of assets; upon verification of the ownership or security interest information for the asset included in the registration request, generating an enhanced data record, the enhanced data record including: a second data record including a principal parameter populated based on the portion of the first credit amount, and a credit rate parameter populated with a reduced credit rate, the second data record associated with the asset data; and the first data record with the principal parameter adjusted based on the portion of the first credit amount included in the second data record.

In accordance with another aspect, the at least one processor is configured for: correlating at least a portion of the asset data with the one or more database records accessed over the at least one communication interface to identify a current value of the asset identified by the asset data; wherein the principal parameter of the second data record is populated based on the current value.

In accordance with another aspect, the at least one processor is configured for: monitoring for impairment event data indicating a change in the current value of the asset; and upon detecting an impairment trigger, modifying the enhanced data record to adjust at least one of: the principal parameter or the credit rate parameter included in the second data record.

In accordance with another aspect, the impairment trigger is detected when a change in the current value of the asset indicates a drop in value relative to the principal parameter in the second data record.

In accordance with another aspect, detecting an impairment trigger comprises: detecting an impairment to a class of assets corresponding to a plurality of enhanced data records stored in the at least one storage device; wherein the impairment trigger is detected when one or more parameters in the corresponding plurality of enhanced data records exceeds a defined threshold.

In accordance with another aspect, the at least one processor is configured for: monitoring for impairment event data indicating an impairment or enhancement of one or more parameters in the account profile record; and upon detecting an impairment or enhancement trigger, modifying the account profile record to adjust at least one of the base credit rate, or the total credit limit.

In accordance with another aspect, the at least one processor is configured for: monitoring the one or more database records accessed over the at least one communication interface to detect a change in security interest information for the asset associated with the enhanced data record, and updating the credit rate parameter based on the change in security interest information.

In accordance with another aspect, correlating at least the portion of the account profile record and the asset data with the one or more databases accessed over the at least one communication interface comprises: extracting a subset of fields from the account profile record or the asset data, and generating a database record request based on the subset of fields; and upon receiving a response to the database record request indicating that the subset of fields is not correlated with a single record, extracting an additional subset of fields from the account profile record or the asset data, and generating a further database record request based on the additional subset.

In accordance with another aspect, the at least one processor is configured for generating a notification when one or more parameters in the enhanced data record is dynamically updated.

In accordance with another aspect, the enhanced data record is associated with the account profile record, and a second account profile record.

In accordance with another aspect, the enhanced data record includes electronic information representing ownership allocation of the asset across the account profile record and the second account profile record.

In accordance with another aspect, the second data record is associated with asset data of a plurality of assets.

In accordance with another aspect, the principal parameters of the first data record and the second data record together constitute a total available pool of credit.

In accordance with another aspect, the processor is further configured to determine, for at least one asset determined to be associated with the account profile record, whether the at least one asset has been used to provision a reduced credit rate by querying the second data record to validate whether the asset data is recorded in relation to the second data record.

In accordance with another aspect, the processor is further configured to upon determining that there is at least one asset has not been associated with the reduced credit rate by querying the second data record, generating a flag on the account profile record indicative of an availability for the at least one asset to be recorded on the enhanced data record.

In accordance with another aspect, the principal parameter of the second data record is periodically updated to reflect a principal amount on a loan associated with the asset.

In accordance with another aspect, the asset is a motor vehicle.

In accordance with another aspect, the motor vehicle is identified by a vehicle identification number.

In accordance with another aspect, the ownership or security interest information for the asset is provided as a financing statement.

In accordance with another aspect, the financing statement is obtained from the one or more database records.

In accordance with another aspect, there is provided a computing device configured to automatically and dynamically provision a flexible loan in relation to a purchase of an asset, the computing device including at least one or more processors operating in conjunction with one or more non-transitory computer-readable media and having a data storage.

In accordance with another aspect, the device includes: a loan provisioning unit adapted to generate control signals representative of a message requesting the provision of an unsecured loan and a secured loan for a borrower, and adapted to provide funds from the unsecured loan to a borrower to fund the purchase of the asset; and a security registration detection unit adapted to detect one or more security registrations validly registered against the asset in favor of a lender; wherein in response to the detection of one or more security registrations validly registered against the asset in favor of the lender, the loan provisioning unit is configured to cause a reallocation of a record of outstanding funds provided from the unsecured loan, the reallocation including reallocating at least a portion of the outstanding funds provided from the unsecured loan to the secured loan; and wherein the secured loan has borrower preferential characteristics relative to the unsecured loan.

In accordance with another aspect, a value of the secured loan is based on a determined loan-to-value attribute associated with the asset.

In accordance with another aspect, the computing device further comprises an asset monitoring unit configured to automatically determine an estimated value of the asset and to monitor the estimated value of the asset in relation to one or more currently outstanding amounts on at least one of the unsecured loan and the secured loan.

In accordance with another aspect, machine-encoded information representative of one or more attributes of the asset is obtained at or around a time of purchase and the machine-encoded information is utilized in conjunction with an automated generation of communications representative of one or more security interest for filing to a security registration database to establish the one or more security registrations validly registered against the asset.

In accordance with another aspect, the machine-encoded information is obtained through a quick response (QR) code.

In accordance with another aspect, the machine-encoded information is obtained through a bar code.

In accordance with another aspect, the loan provisioning unit is further configured to modify characteristics of the unsecured loan during a period of time following the purchase of the asset but prior to the detection of valid registrations of the one or more security interests, the modification of the characteristics of the unsecured loan approximating one or more benefits accrued by the borrower as if the one or more security registrations were registered at or around a time of the purchase of the asset.

In accordance with another aspect, the asset monitoring unit is adapted for receiving one or more inputs associated with the usage characteristics of the asset, and for utilizing the usage characteristics for determining the estimated value of the asset; wherein the asset is a vehicle and the usage characteristics include at least tracked vehicle usage data.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
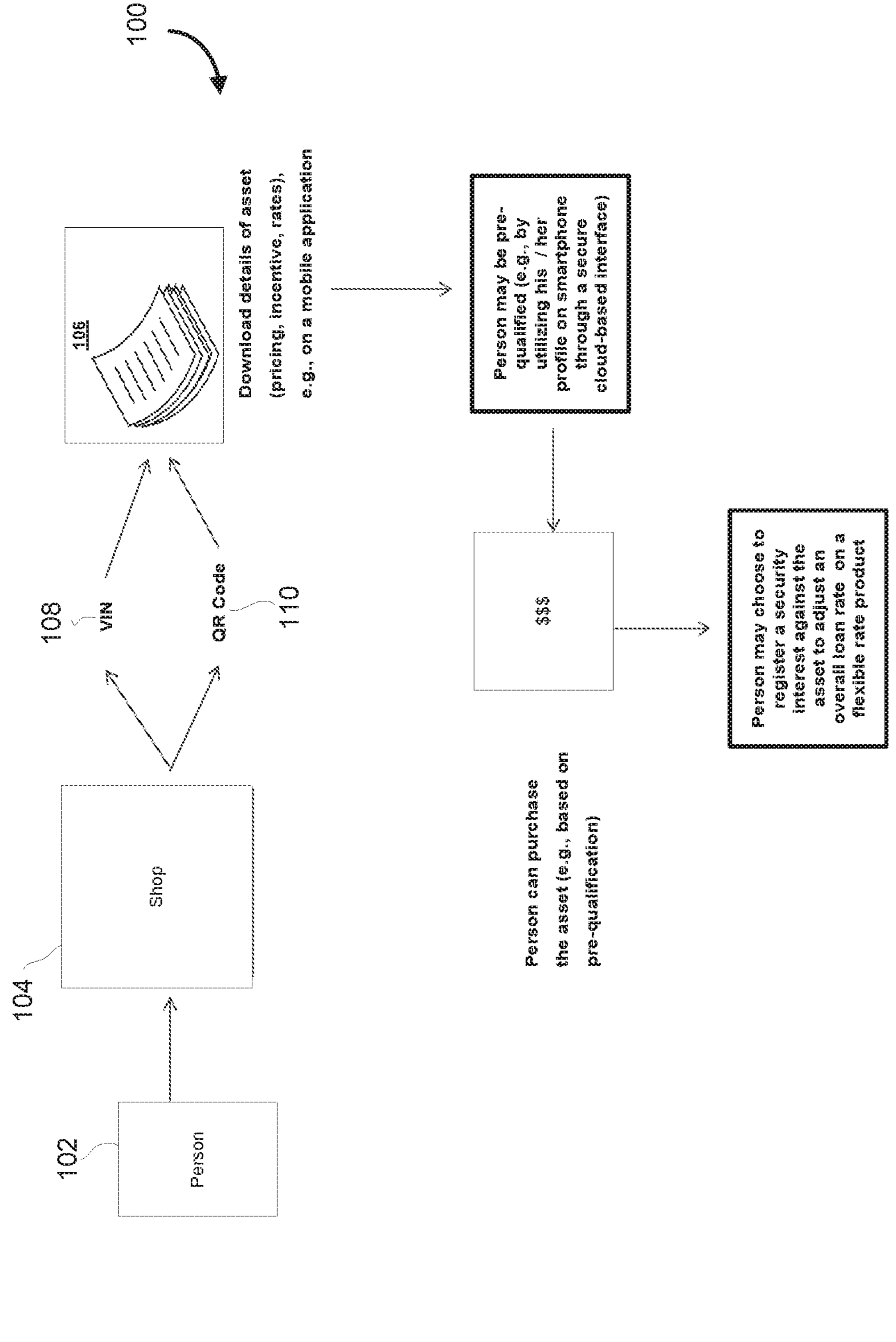
FIG. 1 is a method diagram illustrating, an example method for electronically provisioning a flexible loan (or loans) in relation to an asset purchase, in accordance with some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, various systems, methods, and/or computer-readable media may be provided in relation to automated asset financing, and more particularly, systems, methods, and/or computer-readable media for electronically provisioning a flexible loan (or loans) in relation to an asset purchase. The provisioning of a flexible loan may include, for example, the generation, communication and/or processing of various data processes. The flexible loan may require allocation of different portions of a total loan pool available to an individual or a group of individuals.

The data processes may be representative of information and/or instructions being communicated between one or more computing devices, some computing devices forming one or more systems configured for provisioning flexible loan and/or loans to one or more persons, in relation to various assets. In some embodiments, the systems may be adapted to handle a large volume of transactions (e.g., loan transactions), provisioning a large volume of loans, conducting a large volume of adjustments and analyses.

In some embodiments, the system may be adapted for communicating instruction sets to external computing devices, which, for example, may be storing and/or various elements of information relevant to the provisioning of loans, such as credit scores, risk information, asset (e.g., vehicle) registration databases, etc. In some embodiments, the system may be adapted to automatically collate, prepare and/or generate one or more financing agreements for transmission, effecting one or more security registrations to be validly attached and/or perfected in relation to various assets. Information may be transmitted in various forms, such as electronic records, machine-readable text, machine-encoded instruction sets, metadata, in various formats, encrypted and/or non-encrypted, etc.

The provisioning of the flexible loan may be conducted automatically or semi-automatically by the system. For example, the flexible loan may be comprised of various loans, including an unsecured loan and a secured loan. The system may be configured to maintain various data records indicative of the status of assets and/or relevant security registrations, and, for example, modify loans provided to one or more persons based on the security status of their assets.

The modification of the loan(s) provided, for example, may include a provisioning and/or allocation of debt across one or more different loans, and the allocation of debt across the one or more different loans may vary across a period of time, or based on one or more logical rules applied by the system. For example, the detection of a validly registered and/or perfected security interest registered against an asset may cause a borrower to be eligible for an adjusted rate on all or part of a loan associated with the asset, the asset being purchased using all or a portion of an initial unsecured loan. The adjusted rate, for example may be implemented by way of a modification of allocation of the loan from an "unsecured" portion of an account to a "secured" portion of the account.

The system may be configured such that as the principal remaining on the loan reduces, additional loan lending ability is restored in either the secured or unsecured portion of an account. Similarly, the loan may be split across multiple flexible loan accounts and assets can be allocated and de-allocated in whole or in part, and properties of the flexible loan accounts are adjusted accordingly.

The available allocated or unallocated portions of assets may be provided in the form of characteristics associated with asset pools, and in some embodiments, a system may be configured to verifying that unallocated assets truly are unallocated and available for allocation. For example, the size of a pool of available funds may be determined through received client account profile information.

In some embodiments, the benefit derived from adjusted loan characteristics may be determined and/or provided to the borrower at or around the moment of purchase (rather than the detection of the perfection and/or attachment of the security interest). For example, while the system may be configured only to provision the secured and unsecured loan amounts after perfection of the security interest, nonetheless, there may be a commercial interest in providing benefits and/or an analog thereof around the time of purchase.

This may, for example, provide a commercial incentive in relation to the purchasing process of a potential borrower when buying the asset. In some embodiments, such benefits and/or an analog thereof may be withdrawn if, for example, after a pre-determined time, the borrower fails to properly perfect the security interest and/or fails to provide documentation of the perfection.

From a backend perspective, the system may, for example, cause the provisioning of a flexible loan by issuing instruction signals to a financial institution's computing devices to open a separate secured loan, and to reallocate the outstanding loan amounts across the secured and unsecured loans. Such instruction signals, for example, may include elements of information, such as data representative of a client account number, floating-point representations of real numbers (e.g., indicative of the amount of a loan and/or allocations between the secured and the unsecured loans), various electronic flags (or metadata) indicative of a loan status, one or more strings and/or pointers associated with the security interest (e.g., related to a record of a security interest, a status of a security interest, a value of collateral held in relation to a security interest), among others.

The system may be configured for dynamic monitoring of credit parameters, for example, and may include various communication interfaces, storage devices configured to store data records, and processors. Dynamic monitoring of credit parameters includes, for example, the tracking and/or causing modification of allocations between one or more loans responsive to one or more triggers, including, for example, one or more loans that include a portion that is unsecured and a portion that is secured, having different credit characteristics, such as applicable interest rates, etc.

The allocation may be triggered automatically in accordance with one or more machine-readable instruction sets, for example, responsive to automated results obtained from inquiries of external databases. These inquiries, for example, may be conducted in relation to one or more security interests (e.g., encumbrances, liens) that may be associated with an asset by way of a registration request. Accordingly, the credit parameters of the loans may be configured to shift in accordance with dynamically monitored information, including credit events, registrations, impairments, etc.

Data records may be advantageously structured to facilitate the dynamic monitoring of credit parameters. For example, different data record types may be generated and updated, having instruction sets or information stored thereon that is processed by downstream systems to effect changes in account/loan provisioning parameters.

In an embodiment, the processors of the system are configured for receiving signals representing a first credit amount associated with an account profile record, the account profile record defining a base credit rate and a total credit limit, generating a first data record defining credit parameters, the credit parameters including a principal parameter populated with the first credit amount, and a credit rate parameter populated with the base credit rate and storing the first data record.

Using the first data record, the processor may receive a registration request associated with the account profile record, the registration request including asset data identifying an asset to be registered against at least a portion of the first credit amount, correlate at least a portion of the account profile record and the asset data with one or more database records accessed over the at least one communication interface, the one or more databases records including ownership or security interest information for a plurality of assets.

Upon verification of the ownership or security interest information for the asset including in the registration request, the processor may then generate an enhanced data record, the enhanced data record including: a second data record including a principal parameter populated based on the portion of the first credit amount, and a credit rate parameter populated with a reduced credit rate, the second data record associated with the asset data; and the first data record with the principal parameter adjusted based on the portion of the first credit amount included in the second data record.

The verification of the ownership or security interest may include, for example, a query automatically generated based on the name of the individual or other identifying information about the asset. The query may, for example, be a lien search wherein security interests may be reviewed and/or otherwise investigated. In some embodiments, the system may be configured to monitor and/or track (e.g., periodically or continuously) the status of the assets and/or security registrations, and, may, for example, trigger various actions to occur upon detection and/or satisfaction of a condition and/or a trigger. For example, if the system detects that the security interest is subordinate to a third party's security interest (e.g., there is already an existing lien), one or more actions may be triggered, such as the generation of a notification and/or an alarm, or, in some embodiments, an automatic adjustment of one or more secured loan characteristics.

In respect of the enhanced data record, at least a portion of the asset data may be correlated with the one or more database records accessed over the at least one communication interface to identify a current value of the asset identified by the asset data, and the principal parameter of the second data record is populated based on the current value. The principal parameter of the first data record is then adjusted based on the principal parameter of the second data record. For example, the second data record reflects the amount of the loan that is subject to the reduced rate, and the first data record reflects the amount of the loan that is still subject to an original rate.

In some embodiments, the system may also be configured to provision a secured loan having characteristics that may be derived based on one or more logical rules, at least one logical rule associated with the security interest associated with the asset. The characteristics, for example, may include an interest rate, an amortization period, a compounding term, the presence of various additional terms and conditions, such as convertibility between a fixed rate and a variable rate, pre-payment terms, acceleration terms, among others.

In some embodiments, the system may be configured to automatically determine, modify and/or adapt characteristics of the secured loan through one or more computerized determinations of value associated with the asset and/or the outstanding loan amounts, for example, modifying the secured loan characteristics based on a monitored loan-to-value ratio, etc.

Such modification may be automatically generated, and in some embodiments, a valuation unit may be utilized to periodically and/or continuously conduct automated valuations and/or estimates of valuations related to the underlying asset in relation to one or more factors. For example, if the system has, in a record associated with the person, an employment record noting the person is a travelling salesman, the valuation unit may utilize this information in conducting various automatic determinations indicative of an interference that the value of the asset (e.g., a vehicle) may be reduced in view of the greater depreciation associated with the higher mileage usage inferred based on the person's employment record.

The backend processor may be configured to monitor received event data to identify an impairment event indicating a change in the current value of the asset; and upon detecting an impairment trigger, modify the enhanced data record to adjust at least one of: the principal parameter or the credit rate parameter included in the second data record. Accordingly, the enhanced data record may reflect automatically changing the rate and/or the principal associated with a rate based on change in asset price. For example, the impairment trigger can be identified when a change in the current value of the asset indicates a drop in value relative to the principal parameter in the second data record.

In some embodiments, determined impairment events are not limited to individual assets, but rather, are determined to apply across (or span) an entire class of assets. For example, these impairment events may be derived, based, for example, on industry-wide, manufacturer-wide, make/model-wide impairment triggers. As a recent example, a major recall of vehicles having unsafe airbags or substandard adherence to emissions regulations may cause the actual value of these vehicles to decrease relative to their current recorded values.

Accordingly, the credit rate parameter and/or the principal parameter on the enhanced data record may be automatically adjusted to account for such impairment triggers (e.g., when a predefined threshold is exceeded for one or more records in the enhanced data records). Conversely, another type of event may be the removal or cancellation of an impairment event, for example, where said impairment event may be determined to be over or a false alarm.

Various benefits may be provided by embodiments of the system, for example, the provisioning of a large volume of loans and registrations of security interests may otherwise be unfeasible in view of costs associated with conventional approaches and manual systems, and may benefit from automation as much of the information and/or data may be automatically or semi-automatically recorded as part of a transaction, or using various available tools, such as cameras, scanners, etc.

The ability to automatically account for potential impairment events, through, for example, the maintenance of the enhanced data record is that these potential estimated impairments can be automatically accounted for by the system. Given the large volumes of transactions, experienced by the system, a greater level of granularity can be achieved whereby a more realistic value and accommodation of loan values is provided by way of automation. In contrast to purely human implementation, the system provides an improved approximation of the actual risk associated with the transaction, based on received event/data records.

Furthermore, a potential competitive advantage may be in an ability to compute and/or provide loans whose characteristics (e.g., interest rates) are most carefully calibrated in relation to the risk profile associated with a loan. The system, for example, may be configured such that various aspects of information are tracked and/or monitored to aid the determination of a right-sized loan. For example, the system may be configured to receive data from various external systems, the external systems providing information that may be utilized by the system in generating a risk profile in relation to the person and/or the value of the asset.

For example, a secured loan may be provisioned having an adjustable interest rate that is adjusted based on the system's determination of the current loan to value of the asset, wherein the loan to value is determined not just on an identified present value, but also a risk-adjusted future value based on, for example, the person's profile, external data, and/or a profile associated with the underlying asset.

In some embodiments, the system is configured to automatically generate an electronic registration (e.g., financing statement) of a corresponding security interest or other type of recordal, and to undertake steps to perfect said security interest, such as generating signals for instructing an interface for the recordal of the security interest on an applicable personal security registrar, or a system for effecting public notice of said security interest.

The state/status of the electronic registration may be a factor for establishing whether the enhanced data record should be modified by the system. For example, in some embodiments, the system is configured to monitor the one or more database records accessed over the at least one communication interface to detect a change in security interest information for the asset associated with the enhanced data record, and to update the credit rate parameter based on the change in security interest information. There may be different rates, for example, for perfected/unperfected security interests, security interests of different types (e.g., purchase money security interest (PMSI)) and seniority (whether the security interest is subordinate, senior, junior to other interests), etc.

Interacting with security interest databases may encounter obstacles in relation to data cleanliness and matching. For example, the records stored on said security interest databases are often not uniquely matched to any unique primary or foreign key, and rather, require the more imprecise estimation of a match through comparing information records. Accordingly, in some embodiments, the system may be configured to mitigate some of these issues through the use of alternate identifiers, defined levels of similarities, estimation procedures, among others. In some embodiments, the system may be further configured to utilize one or more codes that may be encoded directly into the loan transaction at the time of generation of security interest for recording.

From a backend perspective, the processor may extract a subset of fields from the account profile record or the asset data, and generate a database record request based on the subset of fields; and upon receiving a response to the database record request indicating that the subset of fields is not correlated with a single record, extracting an additional subset of fields from the account profile record or the asset data, and generating a further database record request based on the additional subset.

The enhanced data record may be tracked such that whenever a update is made, a notification is provided. In some embodiments, the security interest is split across two loan accounts and accordingly, the enhanced data record is associated with the account profile record, and a second account profile record.

FIG. 1 is a method diagram 100 illustrating a method for purchasing an asset (e.g., a vehicle) and obtaining information about the asset which may be utilized, for example, to set up a security interest in the asset so that a lender 106 may provide an adjustment to a loan, in accordance with some embodiments.

As the industry for providing loans, especially loans to consumers may be highly competitive, an automated system for providing loans in view of an aggregate and/or automated risk determination relating not only to a person, but also an underlying asset that is the subject of a security interest may be desirable.

Figure 2:
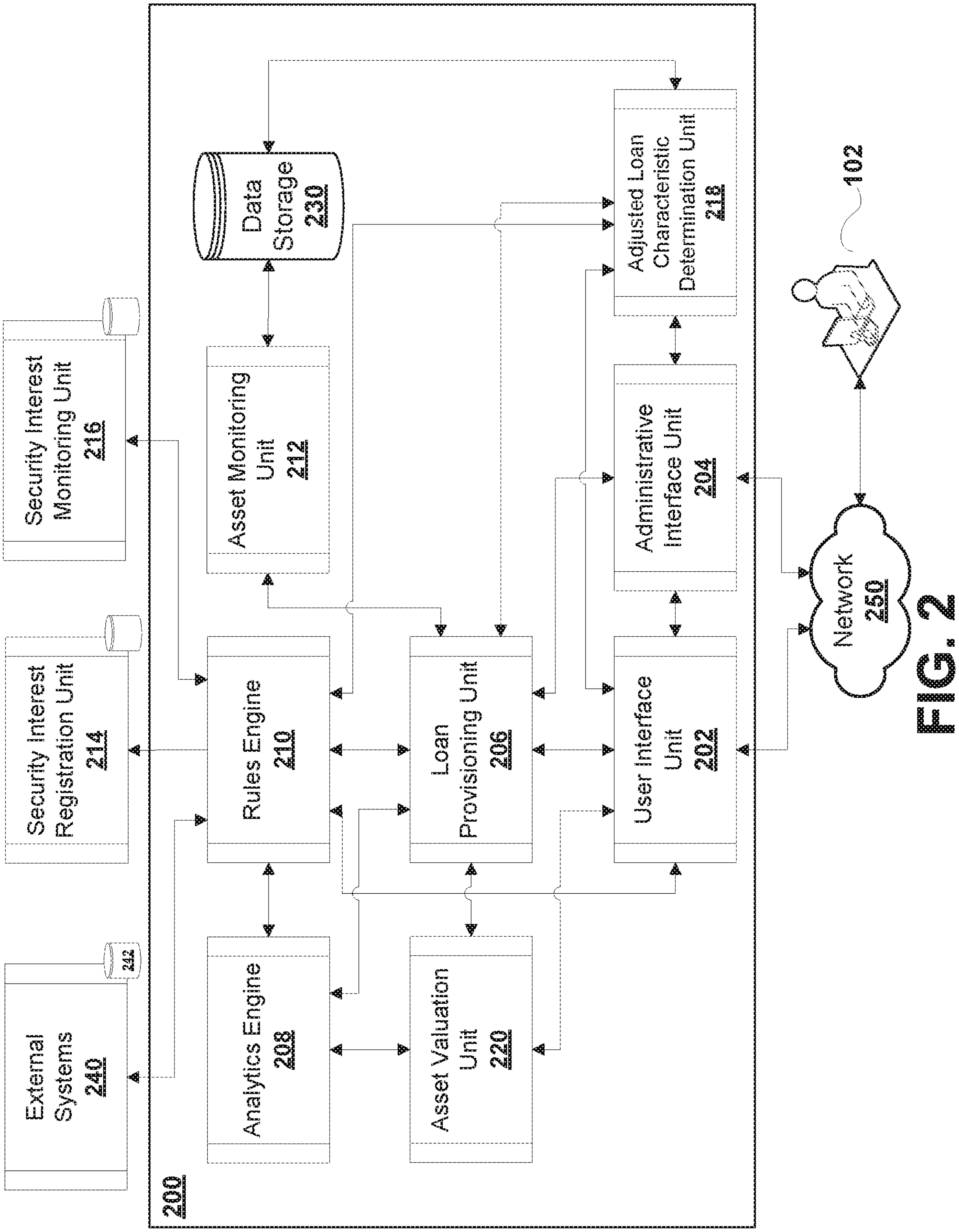
FIG. 2 is a block schematic diagram of an example system for electronically provisioning a flexible loan (or loans) in relation to an asset purchase, illustrative of some components of the system, in accordance with some embodiments.

The method is performed through computer implementation by components of a system 200, an example of which is provided in FIG. 2.

A person 102 (e.g., an individual, a sole proprietor, a legal person [e.g., a corporation], an organization [e.g., a partnership]) may engage in a transaction to purchase an asset (e.g., an automobile) from a seller 104. In the process of purchasing the asset, the various aspects of information may be determined by way of a data gathering process (e.g., a pre-qualification process, a qualification process, a data entry process, a data scraping process). The information may be associated with the asset being purchased (e.g., mileage, model, make), the person 102 individually, the seller 104, among others. There may also be associated metadata, capturing information such as the date, the time, the season, etc. For example, a VIN number 108 may be provided, or a QR code 110 may be provided. Extracted information may include various details, and may be stored on various data storage devices for later usage and/or analysis.

One or more lenders 106 (e.g., various financial institutions) may provision a flexible loan product comprised of one or more loans to facilitate the purchase of the asset, and the one or more loans may include, for example, a combination of unsecured and secured loans. For example, a flexible loan product may include at least one unsecured loan and at least one secured loan. In some embodiments, an unsecured loan may be provisioned when the purchase is initially made, and following the purchase, the person 102 and/or another entity may register (e.g., record, attach, and/or perfect) a security interest against the asset in favor of the one or more lenders 106 (or other secured parties).

The security interest may be provisioned and/or set up by the person 102 in exchange for a reduced interest rate as the one or more lenders 106 may be given various rights in relation to the asset, such as the ability to realize on (e.g., collect, obtain preferential rights regarding, seize, sell) the asset underlying the security interest, subject to various terms and/or conditions of the security interest and/or the presence of any competing interests (e.g., more senior secured parties, third parties being given preferential rights), etc.

In the context of an automotive transaction, a person 102 may be seeking to purchase a vehicle (e.g., car, bus, truck, motorcycle, airplane, train, snowmobile) from a seller 104 (e.g., a dealer, a private individual). The vehicle transaction, for example, may have various characteristics, such as financing, loans, etc., and a part or all of the transaction may include financing. For example, the vehicle may be purchased at a “cash price” to take advantage of various incentives offered by a dealer. The cash price may, for example, be financed by a lender 106 associated with the person 102, such as a financial institution (e.g., a bank). This information, for example, may be utilized by the system in preparing financing agreements without further input from a person 102, for example.

In some embodiments, the lender 106 provides an initial unsecured loan in supporting the purchase. The initial unsecured loan may represent some or all of the purchase price. Data relating to the proposed transaction and the loan itself may be recorded in the form of a first data record. This data define credit parameters associated with the person 102. The credit parameters may include, for example, principal amounts, credit rates, base credit rates, among others.

After the vehicle has been purchased and/or title has shifted to the person 102, the person 102 may then cause the registration of a security interest wherein the vehicle, and/or other assets, may be listed. In some embodiments, the system 200 is configured to utilize the obtained VIN information and the person 102's information in automatically generating a financing agreement whereabouts information relevant to the identity of the person 102 and the asset itself are automatically prepared.

The process for automatically generating the financing statement and its subsequent registration and/or recordal on one or more databases is conducted by the system 200. The fields of the financing statement are populated based on the tracked asset information, including any description of the collateral, principal amount, maturity information, among others. For example, the vehicle information number of the asset may recorded on the financing statement. The financing statement may be then perfected by way of registration through an automatic upload of a data payload to a corresponding database. In some embodiments, a QR code or otherwise generated code may also be placed into the registration (e.g., written into the financing statement, etc.)

In exchange for the registration of the security interest, the lender 106 may provide preferential loan characteristics to the person 102, such as an adjusted and/or reduced financing rate (e.g., basis point reduction, shorter/longer amortization period, payment frequency, pre-payment/acceleration options).

The specific modification of characteristics may be impacted by various factors, such as the make/model/condition/mileage/color of the automobile, and/or by other risk factors associated with the person 102 (e.g., employment history, credit score, city of residence) as determined by the lender 106 and/or other third parties. For example, a bank's risk analysis systems may be utilized to detect such factors and/or weigh the factors accordingly. An adjusted loan may be provisioned such that the adjusted loan may be beneficial to the person 102 relative to the initial loan, in view of the security posted as the security interest.

For example, the adjustment of the loan may be automatically triggered through a later search of a security interest database for records relating to the person 102, to validate that the security interest has been properly perfected and recorded. In particular, the VIN of the vehicle may be compared and revisited to ensure that a registration is properly perfected.

In some embodiments, the adjusted loan may include the provisioning of a second loan that is a secured loan, and include the shifting of all or a portion of the initial unsecured loan into a secured loan. In some embodiments, the total amounts of outstanding loan, unsecured and/or secured, may be tracked and/or monitored such that a flexible, revolver-type loan may be advantageously provided to the person 102. For example, where the loans may have various caps and/or limits, the shifting of all or a portion of the initial unsecured loan into a secured loan may “free up” an amount of available unsecured credit, allowing the person 102 to potentially apply the “freed up” credit towards other purposes, such as another purchase, etc. This “freeing up” may occur over a period of time, for example, as the loan is paid over a number of years, the amount paid off may be made available to be used for other purchases (e.g., auto purchases). Accordingly, a shifting allocation may occur between two separate loan accounts, one for an unsecured loan, and a second for a secured loan.

In some embodiments, various elements of information are captured during the purchase process and/or subsequent to the purchase process. For example, to minimize (e.g., reduce and/or eliminate) the time that the initial unsecured financing is active prior to an adjustment (e.g., a rate reduction), the person 102 may provide information regarding the purchaser (e.g., by scanning the vehicle's VIN or a corresponding QR code identifying the vehicle with a mobile device) immediately and/or shortly thereafter purchasing the vehicle.

In some embodiments, machine-encoded information is captured during various processes associated with purchasing, facilitating the process of preparing and/or filing security registrations. Such processes may be conducted, for example, with no further input from the person 102 or the seller 104, and may save resources and/or time expended in relation to the preparation and/or filing of security registrations. Further, errors may be reduced that may otherwise be introduced during the preparation and/or filing of security registrations.

In some embodiments, the various elements of information are captured during the purchase process and/or subsequent to the purchase process may also include information that is already stored and/or generated by seller 104's computing systems, for example, inventory records, SKU numbers, unique inventory identifiers, characteristics, etc. This information may further not only include security interest-related information, but may also include information associated with the underlying asset (e.g., characteristics) that may be utilized, for example, by the system in the future for conducting automated valuations of the asset (e.g., to conduct a “mark to market” analysis for automatically assessing whether the underlying assets are tracking properly to book value and/or loan value).

A device may be utilized to communicate the identifying data (and/or other types of data and/or metadata) to a computing system associated with the lender 106 together with other identifying user information, which may be automatically populated by, for example, reading from other data sources on the device and/or otherwise associated (e.g., GPS coordinates of the purchase, dealership name, time of sale, sale conditions, promotions, credit scores). In some embodiments, a party to the transaction (e.g., the dealer) may communicate some or all of this information directly to the lender 106 (e.g., the bank) on behalf of the person 102 at the time of the asset purchase, for example, if the dealer is pre-registered with the lender 106.

In some embodiments, the adjusted loan characteristics may be continually and/or periodically adjusted. For example, as the lender 106 has a measure of risk exposure associated with the value of the underlying asset subject to the security interest, the lender 106 may wish to adjust the loan characteristics during a period of time (e.g., to "right size" the loan characteristics in view of various parameters and/or contexts, such as a "loan to value" amount). As a specific example, where the loan is in relation to a vehicle, the lender 106 may wish to take into consideration various risk factors to ensure that the characteristics of the loan are appropriate. Simply having a security interest registered (e.g., attached and perfected) on the asset may not be indicative of an overall risk profile associated with the asset. The asset value may become impaired over time, suffer from depreciation effects (e.g., faster-than-expected depreciation), the asset may become difficult to realize on (e.g., the person 102 moves the asset out of state/province/country), etc. Further, other risk factors may change over a period of time.

Various secured loans may, for example, be restricted such that the loans may only be issued to the owner (e.g., a person 102 having legal title) of the asset, and in some embodiments, various messages indicative of confirmation of the security interest may be emailed to the person 102 and/or also sent by regular mail.

For improved identify verification, which may be significant and/or of importance when registering a security interest, the user may login using a secure token, such as that provided by a secure cloud technology, by transmitting the token directly from the person 102's device to the lender 106 (e.g., bank), or through the dealer if the dealer if the dealer is equipped accordingly. The secure token may be associated in electronic records with the asset and/or the person 102, for example, to add a further layer of security and/or authentication when recording various elements of information, provisioning loan accounts and/or registering security interests.

The flexible loan product, for example, may be used in purchase situations wherein there may be various sub-vented rates (e.g., based on subsidies available). Sub-vented loans may occur, for example, where a subsidy is provided in relation to the loan. The system may be configured to take into consideration any or all subsidies available in determining the correct size of the secured and/or the unsecured loan(s), for example, basing the value of a secured loan amount based on the actual amount of loan required by a person 102 after subsidies are taken into consideration, or a loan to value calculated post-subsidy.

In some embodiments, the amount of unsecured loan may be associated with a person 102's pre-approved credit limit, and accordingly, as the person 102 converts all or part of an unsecured loan into a secured loan (e.g., by posting security for an asset), the amount of available unsecured loan may be increased by the same and/or a relative amount.

The adjusted loan may, for example, represent all or part of the purchase price of an asset. For example, in the context of a vehicle purchase, 80% of the purchase price may be advanced at a reduced rate on an adjusted, secured loan, while the remaining 20% may be advanced at a regular, unsecured rate, on an unsecured loan.

In some embodiments, where the security has been posted or will be posted by way of a security interest, but the perfection of the security interest has not yet occurred and/or been verified, a corresponding rebate may be provided in relation to the unsecured loan (corresponding to the amount of savings under an adjusted loan) as if the loan has been already adjusted and the security interest were perfected. For example, as an incentive, a lender 106 may provide person 102 with a discounted rate during a time after the person 102 promises to attach a security interest against the asset, but before the attachment (and/or perfection) of the security interest has been fully verified by lender 106.

FIG. 2 is a block schematic diagram of an example system for electronically provisioning a flexible loan (or loans) in relation to an asset purchase, illustrative of some components of the system, in accordance with some embodiments.

A system 200 may be provided to facilitate and/or support one or more transactions that occur in the process of provisioning a flexible loan product, the system 200 including, for example, an user interface unit 202, an administrative interface unit 204, a loan provisioning unit 206, an analytics engine 208, a rules engine 210, an asset monitoring unit 212, a security interest registration unit 214, a security interest monitoring unit 216, an adjusted loan characteristic determination unit 218, an asset valuation unit 220, and a data storage 230. The system 200 may be adapted to communicate with one or more external systems 240 and/or external databases 242. System 200, for example may be adapted for communication with various computing devices through network 250. The system 200 may include communication interfaces (e.g., application programming interfaces, network connections) and is configured for interoperation/communication with various external computing devices.

System 200 may be provided in the form of software, hardware, embedded firmware, or a combination thereof. For example, system 200 may be provided in a data centre, in a workstation, in the form of servers, computer processors, memory (e.g., non-transitory computer-readable media), and/or data storage. In some embodiments, system 200 is provided as a special purpose machine specifically configured for receiving interface signals representing a profile record, generating the first data record and the enhanced data record.

Data may be stored on various types of storage technologies at data storage 230, such as physical storage devices (e.g., hard drives, solid state drives, flash memory, random access memory, read only memory), shared network resources that may be provided on an on-demand basis, etc. Data may be stored in the form of database records, flat files, relational records, non-relational records, text files, spreadsheets, extended markup language files, etc.

Data may be stored as various data structures, including, for example, arrays, database record entries, among others. Data is stored in the form of a first data record and a second data record.

In some embodiments, an enhanced data record is provided and stored in data storage 230 that encapsulates both the first data record and the second data record together. The enhanced data record is processed by downstream systems as an encapsulated package providing signals and instruction sets instructing the provisioning of a reduced rate flexible loan having incorporated various triggers and conditions, which if not met or triggered, may lead to the reverting of the reduced rate to the rate provided in the first data record, or a modification of the rate thereof.

Data storage 230 stores information associated with account profile records, which, for example, may be indicative of how much credit, the general creditworthiness, etc. of a particular user. The account profile may be polled periodically, dynamically, or retrieved entirely in a one-time basis. The account profile may encapsulate information such as identifying information (e.g., address, full legal name, birth day, social insurance number), annual salary, credit history, available credit, flags indicative of prior bankruptcies/credit conditions/restructuring, among others.

Account profiles may be associated with registration requests, which may, include at least requests for registration against a specific asset to be registered for a credit amount against the account profile.

The requests for registration may indicate the amount of credit required, the type of asset to be purchased, information associated with the asset (e.g., VIN number, make, model, color, trim package, expected price, actual price, rebates available, used/new state, jurisdiction, manufacturing location).

In some embodiments, system 200, and/or components thereof may be provided in the form of a 'cloud computing' type platform, wherein shared resources, data, and/or information may be pooled together and/or provisioned based on various requirements, such as expected and/or current demand, supply, latency, geographical requirements, among others. Benefits of a 'cloud computing' type embodiment include, for example, the ability to dynamically re-allocate resources, reducing a potential fixed overhead and/or operational costs; the ability to rapidly meet fluctuating and/or unpredictable demands, etc.

In some embodiments, a mobile platform may be utilized in conjunction or to provide system 200. For example, such a platform may be operatively connected to the system 200 through an interfaces 202, and/or 204, through network 250. The network 250 may, for example, include the internet, intranets, point to point networks, ring networks, etc., and may utilize various technologies, such as TCP/IP, UDP, etc.

The system 200 may, for example, be a platform that may interact with one or more users, the users being various individuals, such as lender employees, seller employees, individual borrowers, etc., through user interface unit 202. User interface unit 202, for example, may provide a secured interface wherein users may be able to conduct various tasks, such as uploading and/or downloading information, requesting services, loans, reviewing agreements, etc. The user interface unit 202 may, in some embodiments, be configured to be mobile-enabled such that a user is able to access the user interface unit 202 through a suitably configured mobile device (e.g., a tablet, a mobile phone, a laptop computer).

The administrative interface unit 204 may be adapted such that features of the system 200 may be modified, and/or analytics reports may be run and/or processed. For example, administrative interface unit 204 may be utilized by various administrators to set up one or more promotions, enforce business rules, set a default margin over risk-adjusted minimum rates, etc., in association with the provisioning of various loans.

The loan provisioning unit 206 may be adapted to provision one or more loans, the one or more loans, in some embodiments, including secured loans, unsecured loans, etc. Where the loan is a secured loan, the loan provisioning unit 206 may, for example, store on a database record stored on data storage 230 a linkage to a particular asset record that may also be stored on data storage 230, indicating that the secured loan is secured against the particular asset.

The loan provisioning unit 206 is configured to generate instructions generating one or more enhanced data records that are used to track allocations between unsecured and secured accounts, and modifications thereof over time. The database record is associated with a corresponding account profile record, and the account profile record indicates a base credit rate and a total credit limit. For example, an individual may be of average creditworthiness and may be associated with a base credit rate of 7.5% and a total credit limit of $25,000. On the other hand, another individual may be of low credit worthiness and the account profile record for this individual may indicate instead a base credit rate of 15% and a total credit limit of $20,000.

In some embodiments, the linkage is a pointer to a record associated with the asset. The loan provisioning unit 206, may also be configured to monitor an allocation between one or more loans, for example, between a secured and an unsecured loan.

In some embodiments, the loan provisioning unit 206 may dynamically size the secured and/or the unsecured loan based on the amount of loan outstanding, etc., by way of the enhanced data record. For example, as a person 102 pays off the secured loan and/or the unsecured loan, more borrowing capacity may become available in relation to one or more other loans. The loan provisioning unit 206 may dynamically size the secured and unsecured loan by way of tracked data records stored on data storage 230, such as various credit parameters of various enhanced data records. The corresponding modifications of the credit parameters may cause the aggregate interest rate associated with the loans to change.

Accordingly, the loan provisioning unit 206 may be configured to interface with data storage 230 and external systems 240 to continually/periodically modify and update the account profile record of the individual to match or represent the total amount of outstanding secured and unsecured loans associated with the individual.

The analytics engine 208 may be configured to provide various aspects of reporting and/or data analysis. The analytics engine 208, for example, may interoperate with the one or more external systems 240 and/or external databases 242 to conduct various analyses, for example, to determine a profitability and/or an efficacy associated with the lending (e.g., as compared against actual default rates). Various reports may be run by administrators on the analytics engine 208, for example, to identify that various conditions that were used to estimate when and/or how much loan rates should be reduced, for example, perform as compared to real-world loan returns.

In some embodiments, the analytics engine 208 is configured to support various aspects of machine-learning and/or adaptive weightings to maximize and/or approximate real-world loan returns, for example, a genetic algorithm may be utilized to determine an optimal amount of rate reduction associated with security being posted in relation to a vehicle of a particular make, a particular model year, etc.

The rules engine 210 may be configured to generate, apply, modify, and/or remove various logical rules that may be utilized by the system 200 in modifying characteristics of how and/when various events occur and/or are reacted to by system 200. For example, the rules engine may be associated and/or otherwise linked to the loan provisioning unit 206 and the asset monitoring unit 216 to automatically adjust loan characteristics (e.g., interest rate) on an unsecured loan based on a logical condition and/or a detection of a change that triggers a logical condition. For example, an interest rate may be modified upwards or downwards, based on detected conditions (e.g., a change in a potential loan-to-value, default risk).

The asset monitoring unit 212, for example, may be adapted such that various characteristics of the asset may be monitored to modify the behavior of system 200. In some embodiments, the asset monitoring unit 212 may be configured to track and/or receive various aspects of information associated with the asset, such as vehicle performance, maintenance records, vehicle location, driving habits, etc. This information, for example, may be useful and/or communicated to the asset valuation unit 220 to modify and/or adjust a stored value associated with the value of the asset.

The asset monitoring unit 212 is configured to maintain data records associated with asset information, including allocated and available unallocated portions of assets (e.g., tracked by way of a registered but unallocated asset pool). In some embodiments, the asset monitoring unit 212 is further configured to automatically generate and run periodic queries of the security interest status associated with the person 102. Where assets are identified whose value may not be entirely allocated to a corresponding enhanced data record to receive a reduced credit rate, the asset monitoring unit 212 may generate a notification by way of user interface unit 202, for example, notifying the person 102 of an opportunity to reduce an existing credit rate. Prior to providing such a notification, a query may be conducted to verify that unallocated assets are truly unallocated and available for allocation (e.g., a new lien has not been since placed on the assets in question).

The security interest registration unit 214 may be configured to automatically, or semi-automatically generate various electronic messages and/or communications that are indicative of a security interest for attachment and/or perfection in relation an underlying asset. For example, the security interest registration unit 214 may be configured to receive extracted information (e.g., VIN, make, model, year, current owner on title) about an asset purchase (e.g., a vehicle) and otherwise communicate one or more external systems, such as an external security interest registry database 242 to duly cause a registration pf the security interest. The fields of a financing agreement or other document being recorded may be automatically completed based on the tracked information, and in some embodiments, may be transmitted and/or otherwise recorded on a corresponding external database.

In some embodiments, the security interest registration unit 214 may be adapted interoperation with a security interest monitoring unit 216 for periodic verification and/or validation of security interests stored on an external security interest registry database 242, for example, to ensure that a security interest was duly registered and recorded on file. The periodic verification, for example, may be against the person 102's recorded name, and/or against the VIN of the asset.

The adjusted loan characteristic determination unit 218 may be configured to, based on various logical rules provided by the rules engine 210, adjust one or more loan characteristics based on the presence and/or various factors associated at least with the asset that is the subject of the security interest.

For example, the adjusted loan characteristic determination unit 218 may determine the interest rate rebate that should applied in relation to a security interest being attached and/or perfected in association with an economy car relative to other types of cars (e.g., a hybrid car, a pick-up truck).

The asset valuation unit 220 may be configured for assessing and/or tracking asset valuations for input, for example, into adjusted loan characteristic determination unit 218. In some embodiments, the system 200 may be configured for periodically and/or continuously calculating various ratios and/or metrics, such as loan to value, etc., based on applying one or more valuation models to determine an estimated and/or a real-world value of an asset.

While some assets, for example, vehicles, may be sold with valuations that may be near their true value, the value of the assets may become impaired over a period of time, and valuations may be tracked by asset valuation unit 220 such that modifications and/or adjustments may be made in response (e.g., raising interest rates in accordance with a determined increase in risk and/or value impairment).

Figure 3:
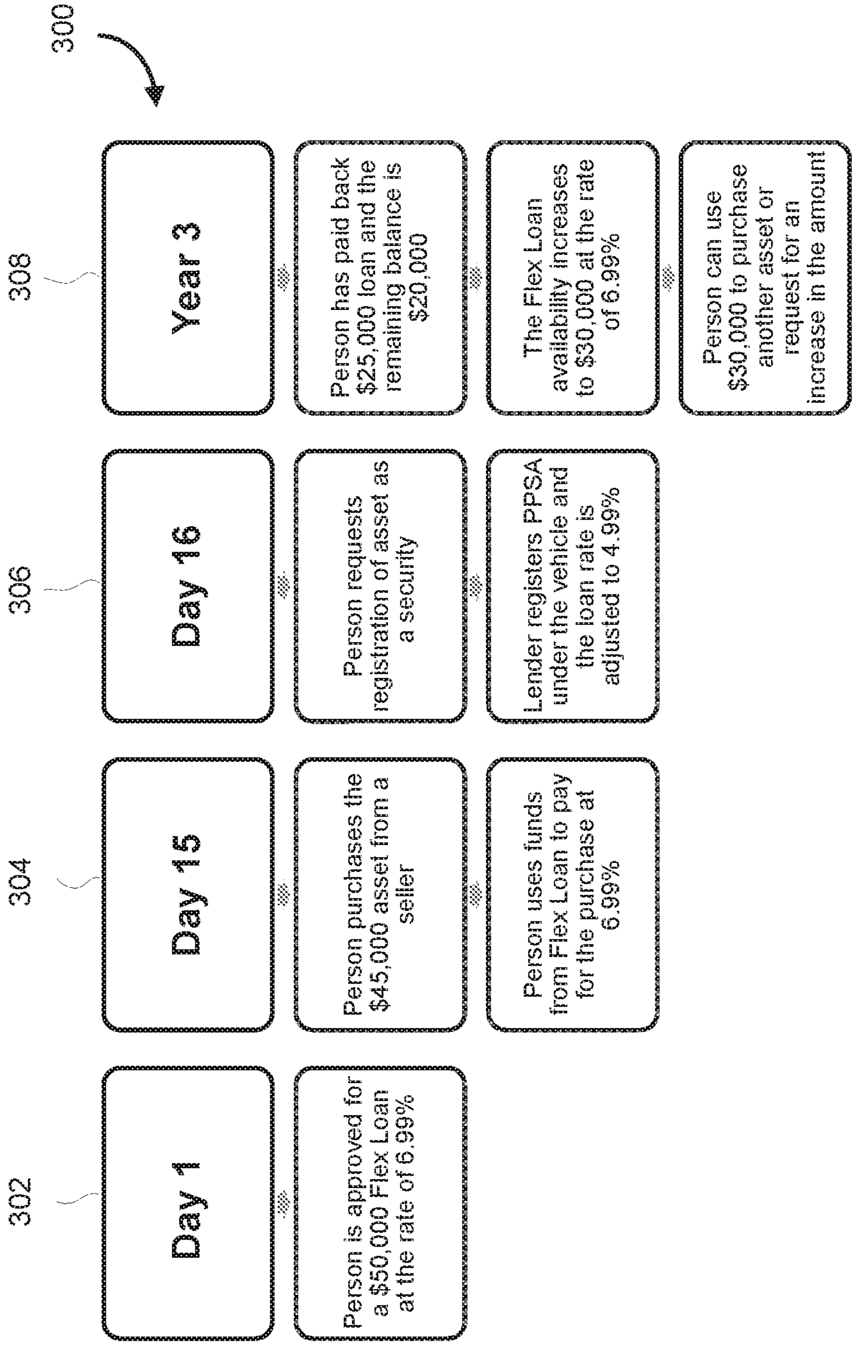
FIG. 3 is an example chart illustrative of example loan characteristics over an example period of time, according to some embodiments.

FIG. 3 is an example chart 300 illustrative of example loan characteristics having workflows 302, 304, 306, and 308, over an example period of time, according to some embodiments. The workflow of 302 is illustrated to indicate that on Day 1, a loan is provisioned. The loan, for example may be provided to person 102 having a value of $50,000, at a rate of 6.99%. This rate is provided based on an unsecured loan being provisioned.

At 304, the person 102 purchases an asset (e.g., a vehicle) that has a nominal value of $45,000 from a seller 104 at Day 15. Person 102, through system 200, requests and obtains funds from the unsecured loan to pay for the purchase at 6.99%.

At 306, the person 102 registers the security interest against the asset the following day, and is now eligible for a reduced rate in relation to the outstanding funds. Accordingly, the system 200 may determine that the security interest has been registered and adjust the rate provided to the person 102 by, for example, transitioning part, or all of the loan into a secured loan having adjusted loan characteristics, the adjusted loan characteristics being determined by system 200 based on the application of one or more logical rules associated with rules engine 210.

At 308, at an arbitrary time in the future, for example, Year 3, the person 102 may have paid off a portion or all of the outstanding loan amounts. For example, the person 102 may have paid back $25,000 in the loan and has a remaining balance of $20,000. Accordingly, the amount of unsecured loan available to the person 102 at an unsecured rate of 6.99% may be increased by an amount determined through rules engine 210 (e.g., $30,000, may not necessarily need to correspond with the amount paid off in the loan) and the person 102 may utilize this amount, for example to finance another purchase of an asset.

Figure 5:
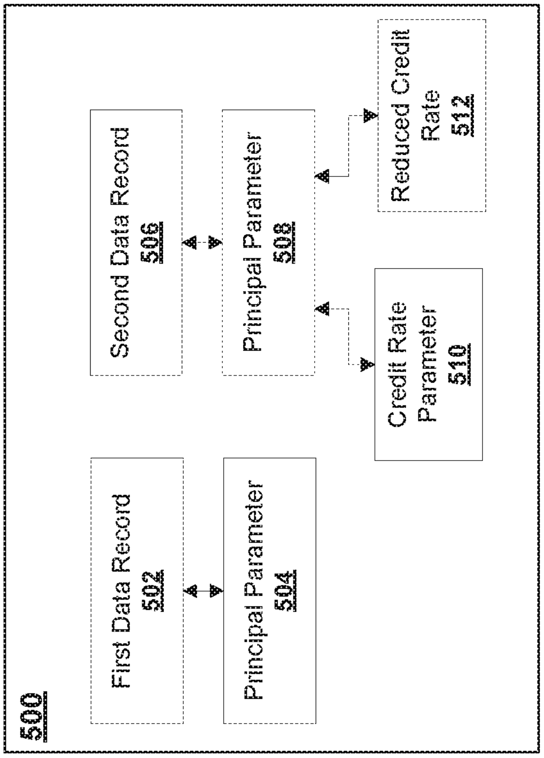
FIG. 5 is a depiction of an example enhanced data record, according to some embodiments.

FIG. 5 is a depiction of an example enhanced data record 500, according to some embodiments. The enhanced data record 500 is generated upon verification of the ownership or security interest information for the asset included in the registration request. For example, a query may be automatically conducted against a personal security interest database based on identifiable information of the asset, and a perfected security interest may thus be verified by the system.

As provided in the enhanced data record 500, the enhanced data record 500 may include both the first data record 502 having a first principal parameter 504 and a second data record 506 having a second principal parameter 508, and a credit rate parameter 510 populated with a reduced credit rate 512.

The second data record 506 is associated with the asset data stored on the registration request, the asset data identifying the asset to be registered against at least a portion of the first credit amount (e.g., as stored on the first data record 502). When the enhanced data record 500 is generated, the first data record 502 on the enhanced data record 500 may be modified such that the principal parameter 504 is adjusted based on the portion of the first credit amount included on the second data record 506.

The second data record 506 reflects the value of the asset registered against the portion of the first credit amount, and thus is provided with the reduced credit rate, and the first data record 502 is adjusted accordingly as provided above to reflect the allocation of the value of the asset to the second data record.

In some embodiments, enhanced data record 500 is associated with a single account profile. In other embodiments, enhanced data record 500 is associated with a plurality of account profiles. For example, loan accounts may be provisioned across multiple individuals or persons, where each of the individuals and persons is a co-borrower.

In some embodiments, a single asset may be apportioned across multiple enhanced data records, and each enhanced data record 500 may be maintained separately based on the portion of the asset of which it is apportioned.

Enhanced data records 500 may be maintained in accordance with modifications of allocations of portions of the assets across multiple flex loan accounts, or within a single flexible loan account (e.g., allocating and un-allocating portions). In some embodiments, allocations of assets and corresponding de-allocations can be performed in whole or in part, and properties of the flex loan accounts are adjusted accordingly by way of modifications to the fields of the enhanced data records.

Figure 6:
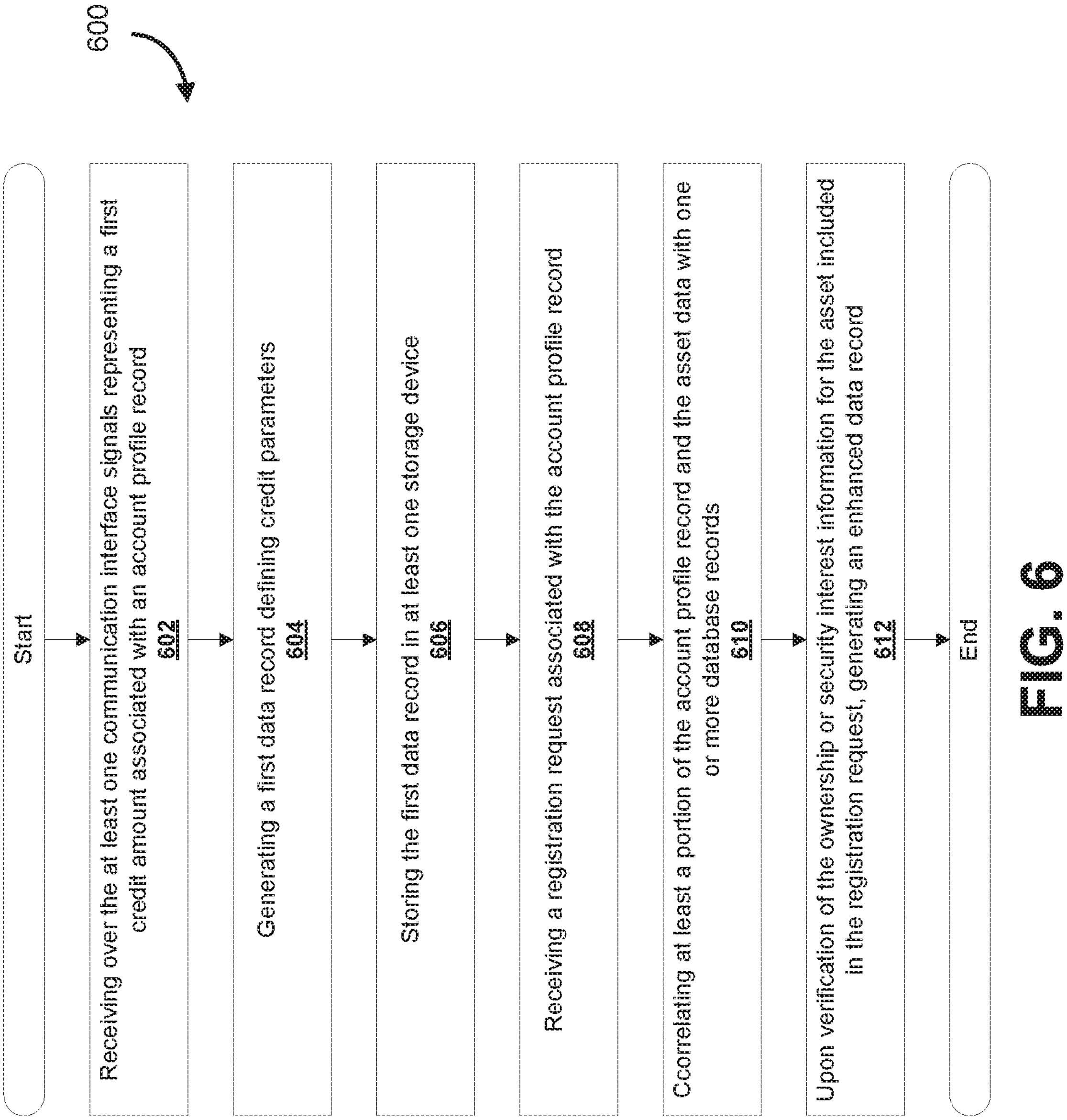
FIG. 6 is a method diagram of an example method for dynamically monitoring credit parameters, according to some embodiments.

FIG. 6 is a method diagram 600 illustrating a method for providing dynamic monitoring of credit parameters, according to some embodiments. Alternative, different, additional, less, or other steps are possible and FIG. 6 is provided as a non-limiting example.

At 602, the system receives signals representing a first credit amount associated with an account profile record, the account profile record defining a base credit rate and a total credit limit. The first credit amount, for example, may be associated with an unsecured loan, and the base credit rate and the total credit limit may be determined and/or populated based on information extracted and/or extrapolated from stored characteristics of the person 102 on the person 102's electronic credit profile record. In some embodiments, the base credit rate and the total credit limits are stored as information extracted from the person 102's electronic profile. In other embodiments, the credit rate and/or the total credit limits are determined by the system by processing the electronic profile to generate a computer-based estimation/inference of the person 102's creditworthiness.

At 604, the system generates a first data record defining credit parameters, the credit parameters including a principal parameter populated with the first credit amount, and a credit rate parameter populated with the base credit rate. The first data record may be stored as a database record, a flat database entry, a flat file, a linked list, etc. The first data record is stored at 606, for example, in data storage 230.

At 608, the system receives a registration request associated with the account profile record, the registration request including asset data identifying an asset to be registered against at least a portion of the first credit amount. The registration request may be provided in the form of an electronic request, carrying an information payload including, for example, an asset identification number, a description of the asset, the type of asset, among others. The registration request may also have various fields populated, including name, address, date of birth, nationality, among others.

The system may, in some embodiments, to provision or allocate security interests of a single asset across multiple loan accounts (e.g., multiple users each having different loan data records and account profile records). For example, consider a very expensive car that is spread across both the accounts of a wife and a husband, reducing the interest rate on accounts held separately through the request of allocation of the loan to both accounts. Similarly, the value of multiple assets may be allocated across a single loan accounts. For example, consider multiple cars being used to reduce the interest rate of a single account.

At 610, the system correlates at least a portion of the account profile record and the asset data with one or more database records accessed over the at least one communication interface, the one or more databases records including ownership or security interest information for a plurality of assets.

The ownership or security interest information may be correlated and accessed, for example, by generating and sending signals representing inquiries to third party databases (e.g., databases 242 associated with external systems 240), that may have been generated in response to security interests generated by security interest registration unit 214.

In some embodiments, the security interests are generated having one or more features encoded therein which aid in the unique or near unique identification of the identity of the person or the asset within the security interest. These features may include, for example, encryption keys, encoded messages encrypted using public/private key pairs, among others. For example, a security interest may be registered wherein a public key is used to encode an identifying message, and the corresponding private key may be utilized by the system to decode the message to verify that the security interest is indeed registered.

This ownership or security interest information can be processed to verify that the ownership or security interest information indeed matches or is a close match to the information stored in relation to the asset on the account profile record.

At 612, upon verification of the ownership or security interest information for the asset including in the registration request, the processor may then generate an enhanced data record, the enhanced data record including: a second data record including a principal parameter populated based on the portion of the first credit amount, and a credit rate parameter populated with a reduced credit rate, the second data record associated with the asset data; and the first data record with the principal parameter adjusted based on the portion of the first credit amount included in the second data record.

All or a portion of the value of an asset may be registered, and the loan provisioning unit 206 and the rules engine 210 are configured to track partial registrations (the asset value is partially allocated). In some embodiments, an asset's value that is partially allocated by way of a registration may be modified to become fully allocated and vice versa, by way of updating of the enhanced data record to reflect the updated credit parameters.

The enhanced data record is a data structure configured for tracking dynamically monitored credit parameters, and may be processed by a downstream system to control the allocation and/or provisioning of loans (e.g., by loan provisioning unit 206). In further embodiments, the credit parameters are monitored over a period of time, and may be modified responsive to electronic information received regarding potential impairments of the value of the underlying asset, among others.

In some embodiments, the credit parameters may also be subject to instructions received from a borrower or a lender, for example, indicating that the enhanced data record should be updated to reflect a difference in loan allocation between the first and the second data record. For instance, the enhanced data record may be utilized to track the payback of the secured loan over time, and the overall pool of available credit may be maintained such that with each reduction of the principal of the secured loan over time, a corresponding increase of available credit for the unsecured loan increases, and vice versa. The mapping between the unsecured and the secured loans may not be necessarily be one to one, for example, the pool of available credit may be proportionally, geometrically related, and other embodiments are possible.

In some embodiments, after the enhanced data record is generated, the system is configured to correlate at least a portion of the asset data associated with the second data record with one or more database records that are accessed over the communication interface(s). For example, one or more fields in the asset data can be used to identify or otherwise access a database record matching or related to the asset data field(s). In some embodiments, the system periodically or continuously monitors the database record over the communication interface for any change in one or more fields. In some embodiments, the database record includes a current market value field matching or related to the asset data. In some embodiments, the database records can include used vehicle resale values, as well as fields for correlating to asset data such as vehicle makes, models, mileage, accident history and the like. In other embodiments, the database records can include fields related to asset classes including vehicles, real property, commercial equipment, farm equipment, oil and gas infrastructure, and/or any other asset class.

In some embodiments, database records can be accessed at one or more servers over the communication interface(s). In some embodiments, the one or more servers may be In some embodiments, the database records may be accessed via an application program interface, a data mining scraper, an automated script configured to submit queries via a web interface, and/or the like. In some embodiments, the system correlates its asset data records with the database records accessed over the communication interface(s) to identify a current value of the asset. The system, in some embodiments, may periodically update or otherwise monitor and populate the second data record with the correlated current asset value.

In some embodiments, the system monitors for impairment event data. In some embodiments, the impairment event data can include a change in current asset value, a negative perception/news regarding an asset data field (e.g. make or model of a vehicle asset record).

In some embodiments, the system is configured to detect an impairment trigger. [in] In some embodiments, an impairment trigger may be detected when a change in the current value of an asset associated with a second data record is detected. In some embodiments, the impairment trigger may be detected when the change in the current asset value changes by more than a threshold amount or percentage.

In some embodiments, an impairment trigger may be detected when the current asset value indicates a drop in value relative to the principal parameter in the second data record. In some embodiments, an impairment trigger may be detected when the current asset value drops below the principal parameter in the second data record.

In some embodiments, an impairment trigger may be detected when multiple assets which share one or more asset data fields are affected by monitored impairment event data. In some embodiments, the system be detect an impairment trigger when a defined number, a defined percentage, or a defined total value of assets associated with second data records are affected by the monitored impairment event data.

In some embodiments, the system monitors impairment event data by accessing data records associated with an account profile record. For example, the system may monitor for changes to a credit rating data, employment status fields, other asset values, other debt values, and the like regarding an individual associated with the account profile record. In some embodiments, an impairment trigger may be detected when changes to one or more of this account profile record information is detected.

In some embodiments, upon detection of an impairment trigger, the system may modify the enhanced data record to adjust one or more data fields such as the principal parameter, credit rate parameter, or other parameters in the first or second data record. In some instances, this may encapsulate a change in risk profile for a particular asset by changing an interest rate for a secured asset, or by changing the apportionment of a secured asset between a secured portion of a loan and an unsecured portion.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized.

Figure 4:
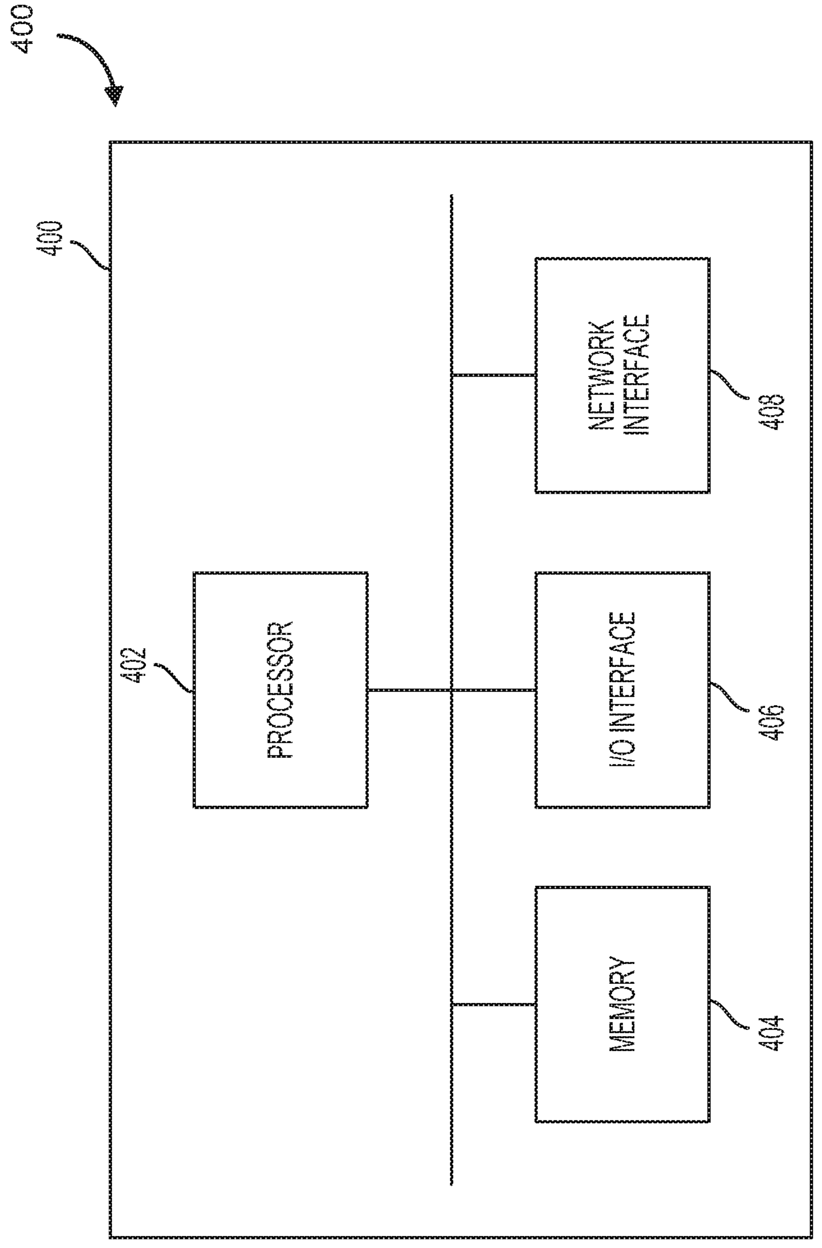
FIG. 4 is a schematic diagram of computing device, exemplary of an embodiment.

FIG. 4 is a schematic diagram of computing device 400, exemplary of an embodiment. As depicted, computing device 400 includes at least one processor 402, memory 404, at least one I/O interface 406, and at least one network interface 408.

Each processor 402 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 404 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 406 enables computing device 400 to interconnect with one or more input devices, such as a keyboard, mouse, camera, touch screen and a microphone, or with one or more output devices such as a display screen and a speaker.

Each network interface 408 enables computing device 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

Computing device 400 may be operable to register and authenticate users (using a login, unique identifier, and password for example) prior to providing access to applications, a local network, network resources, other networks and network security devices. Computing devices 400 may serve one user or multiple users.

What is claimed is:

1. A computer system for controlling rendering of a secure graphical user interface dynamically updated based on dynamic monitoring of external database parameters, the system comprising:

at least one communication interface;

at least one storage device configured to store a plurality of data records;

at least one processor configured for:

receiving, over the at least one communication interface, signals representing a first credit amount associated with an account profile record, the account profile record defining a base credit rate and a total credit limit;

generating a first data record defining credit parameters, the credit parameters including a first principal parameter populated with the first credit amount, and a credit rate parameter populated with the base credit rate;

storing the first data record in the at least one storage device;

receiving an electronic registration request associated with the account profile record, the registration request including asset data identifying an asset to be registered against at least a portion of the first credit amount;

querying, over the at least one communication interface, at least one external database with query data based on at least a portion of the account profile record or the asset data, the at least one external database including one or more database records including ownership or security interest information for a plurality of assets;

upon determining from the query that the query data is correlated with more than one database record accessed over the at least one communication interface, generating at least one alternate identifier for the account profile record or the asset data or code encoded directly into the account profile record, the at least one alternate identifier representing an imprecise estimation of a match;

monitoring using the at least one alternate identifier or code and receiving, over the at least one communication interface, an asset data record indicative of a change in one or more encumbrances associated with one or more assets of the plurality of assets, the asset data record generated based on the ownership or security interest information for the one or more assets stored in the external database;

upon verification of the ownership or security interest information for the identified asset included in the registration request against the ownership or security interest information in the one or more database records accessed over the at least one communication interface, generating an enhanced data record as a data structure having extended dynamic data fields based on the verified asset data in the registration request, the enhanced data record including:

a second data record including a second principal parameter populated with a second credit amount and a credit rate parameter populated with a reduced credit rate, the second credit amount being based on the portion of the first credit amount associated with the identified asset in the verified asset data in the registration request; and the first data record with the first principal parameter adjusted based on the portion of the first credit amount included in the second data record, the first data record and the second data record coupled together using a pointer data object, the pointer data object utilized during automatic monitoring of a shared allocation between the first data record and the second data record;

wherein the enhanced data record, including the first data record and the second data record as the extended dynamic data fields, is processed by a downstream system as an encapsulated data package comprising instruction sets for provisioning of a product;

upon detecting an impairment trigger, modifying one or more data fields of the enhanced data record to adjust at least one of the parameters in the enhanced data record to encapsulate a corresponding change in risk level in the encapsulated data package;

generating one or more electronic signals for instructing an interface of a security registrar system for a recordal of the asset to be registered on the security registrar system based on the enhanced data record, wherein the recordal of the asset on the security registrar system is for effecting public notice of the recordal of the asset;

transmitting, over the at least one communication interface, said one or more electronic signals for instructing the interface of the security registrar system to effect the public notice of the recordal of the asset; and rendering, on the secure graphical interface, one or more graphical visual interface elements representing the extended dynamic data fields of the dynamically updated enhanced data record, the rendering triggered by the detection of the impairment trigger;

wherein the enhanced data record is maintained over a duration of time to dynamically size at least one of the first credit amount of the first data record or the second credit amount of the second data record based on the change in the one or more encumbrances indicated in the received asset data record; and wherein correlating at least the portion of the account profile record and the asset data with the one or more database records accessed over the at least one communication interface comprises:

extracting a subset of fields from the account profile record or the asset data, and generating a database record request based on the subset of fields; and upon receiving a response to the database record request indicating that the subset of fields is not correlated with a single record, extracting an additional subset of fields from the account profile record or the asset data, and generating a further database record request based on the additional subset.

2. The system of claim 1, wherein the at least one processor is configured for:

correlating at least a portion of the asset data with the one or more database records accessed over the at least one communication interface to identify a current value of the asset identified by the asset data;

wherein the second principal parameter of the second data record is populated based on the current value.

3. The system of claim 2, wherein the at least one processor is configured for:

monitoring for impairment event data indicating a change in the current value of the asset; and upon detecting the impairment trigger, modifying the enhanced data record to adjust at least one of: the second principal parameter or the credit rate parameter included in the second data record.

4. The system of claim 3, wherein the impairment trigger is detected when a change in the current value of the asset indicates a drop in value relative to the second principal parameter in the second data record.

5. The system of claim 3, wherein detecting the impairment trigger comprises:

detecting an impairment to a class of assets corresponding to a plurality of enhanced data records stored in the at least one storage device;

wherein the impairment trigger is detected when one or more parameters in the corresponding plurality of enhanced data records exceeds a defined threshold.

6. The system of claim 2, wherein the at least one processor is configured for:

monitoring for impairment event data indicating an impairment or enhancement of one or more parameters in the account profile record; and upon detecting an impairment or enhancement trigger, modifying the account profile record to adjust at least one of the base credit rate, or the total credit limit.

7. The system of claim 1 wherein the at least one processor is configured for:

monitoring the one or more database records accessed over the at least one communication interface to detect a change in security interest information for the asset associated with the enhanced data record, and updating the credit rate parameter based on the change in security interest information.

8. The system of claim 1, wherein the one or more electronic signals for instructing the interface of the security registrar system for the recordal of the asset include one or more field values encoded to support unique identification of the person or the asset within the security interest, the one or more field values including an encoded message encrypted using a public/private key pair, and wherein the at least one processor is configured to utilize a corresponding private key to decode the encoded message to verify that the security interest is registered.

9. The system of claim 1 wherein the enhanced data record is associated with the account profile record, and a second account profile record.

10. The system of claim 9 wherein the enhanced data record includes electronic information representing ownership allocation of the asset across the account profile record and the second account profile record.

11. The system of claim 1 wherein the second data record is associated with asset data of the plurality of assets.

12. The system of claim 1 wherein the principal parameters of the first data record and the second data record together constitute a total available pool of credit.

13. The system of claim 12 wherein the processor is further configured to determine, for at least one asset determined to be associated with the account profile record, whether the at least one asset has been used to provision a reduced credit rate by querying the second data record to validate whether the asset data is recorded in relation to the second data record.

14. The system of claim 13 wherein the processor is further configured to upon determining that there is at least one asset has not been associated with the reduced credit rate by querying the second data record, generate a flag on the account profile record indicative of an availability for the at least one asset to be recorded on the enhanced data record.

15. A computer-implemented method for controlling rendering of a secure graphical user interface dynamically updated based on dynamic monitoring of external database parameters, the method comprising:

receiving over at least one communication interface signals representing a first credit amount associated with an account profile record, the account profile record defining a base credit rate and a total credit limit;

generating a first data record defining credit parameters, the credit parameters including a first principal parameter populated with the first credit amount, and a credit rate parameter populated with the base credit rate;

storing the first data record in at least one storage device;

receiving an electronic registration request associated with the account profile record, the registration request including asset data identifying an asset to be registered against at least a portion of the first credit amount;

querying, over the at least one communication interface, at least one external database with query data based on at least a portion of the account profile record or the asset data, the at least one external database including one or more database records including ownership or security interest information for a plurality of assets;

upon determining from the query that the query data is correlated with more than one database record accessed over the at least one communication interface, generating at least one alternate identifier for the account profile record or the asset data or code encoded directly into the account profile record, the at least one alternate identifier representing an imprecise estimation of a match;

monitoring using the at least one alternate identifier or code and receiving, over the at least one communication interface, an asset data record indicative of a change in one or more encumbrances associated with one or more assets of the plurality of assets, the asset data record generated based on the ownership or security interest information for the one or more assets stored in the external database;

upon verification of the ownership or security interest information for the identified asset included in the registration request against the ownership or security interest information in the one or more database records accessed over the at least one communication interface, generating an enhanced data record as a data structure having extended dynamic data fields based on the verified asset data in the registration request, the enhanced data record including:

a second data record including a second principal parameter populated with a second credit amount and a credit rate parameter populated with a reduced credit rate, the second credit amount being based on the portion of the first credit amount associated with the identified asset in the verified asset data in the registration request; and the first data record with the first principal parameter adjusted based on the portion of the first credit amount included in the second data record, the first data record and the second data record coupled together using a pointer data object, the pointer data object utilized during automatic monitoring of a shared allocation between the first data record and the second data record;

wherein the enhanced data record, including the first data record and the second data record as the extended dynamic data fields, is processed by a downstream system as an encapsulated data package comprising instruction sets for provisioning of a product;

upon detecting an impairment trigger, modifying one or more data fields of the enhanced data record to adjust at least one of the parameters in the enhanced data record to encapsulate a corresponding change in risk level in the encapsulated data package;

generating one or more electronic signals for instructing an interface of a security registrar system for a recordal of the asset to be registered on the security registrar system based on the enhanced data record, wherein the recordal of the asset on the security registrar system is for effecting public notice of the recordal of the asset;

transmitting, over the at least one communication interface, said one or more electronic signals for instructing the interface of the security registrar system to effect the public notice of the recordal of the asset; and rendering, on the secure graphical interface, one or more graphical visual interface elements representing the extended dynamic data fields of the dynamically updated enhanced data record, the rendering triggered by the detection of the impairment trigger;

wherein the enhanced data record is maintained over a duration of time to dynamically size at least one of the first credit amount of the first data record or the second credit amount of the second data record based on the change in the one or more encumbrances indicated in the received asset data record; and wherein correlating at least the portion of the account profile record and the asset data with the one or more database records accessed over the at least one communication interface comprises:

extracting a subset of fields from the account profile record or the asset data, and generating a database record request based on the subset of fields; and upon receiving a response to the database record request indicating that the subset of fields is not correlated with a single record, extracting an additional subset of fields from the account profile record or the asset data, and generating a further database record request based on the additional subset.

16. The method of claim 15, further comprising:

correlating at least a portion of the asset data with the one or more database records accessed over the at least one communication interface to identify a current value of the asset identified by the asset data;

wherein the second principal parameter of the second data record is populated based on the current value.

17. The method of claim 16, further comprising:

monitoring for impairment event data indicating a change in the current value of the asset; and upon detecting the impairment trigger, modifying the enhanced data record to adjust at least one of: the second principal parameter or the credit rate parameter included in the second data record.

18. The method of claim 17, wherein the impairment trigger is detected when a change in the current value of the asset indicates a drop in value relative to the second principal parameter in the second data record.

19. A non-transitory computer readable medium having machine readable instructions stored thereon, the machine readable instructions, when executed by a processor, cause the processor to perform a computer-implemented method for controlling rendering of a secure graphical user interface dynamically updated based on dynamic monitoring of external database parameters, the method comprising:

receiving over at least one communication interface signals representing a first credit amount associated with an account profile record, the account profile record defining a base credit rate and a total credit limit;

generating a first data record defining credit parameters, the credit parameters including a first principal parameter populated with the first credit amount, and a credit rate parameter populated with the base credit rate;

storing the first data record in at least one storage device;

receiving an electronic registration request associated with the account profile record, the registration request including asset data identifying an asset to be registered against at least a portion of the first credit amount;

querying, over the at least one communication interface, at least one external database with query data based on at least a portion of the account profile record or the asset data, the at least one external database including one or more database records including ownership or security interest information for a plurality of assets;

upon determining from the query that the query data is correlated with more than one database record accessed over the at least one communication interface, generating at least one alternate identifier for the account profile record or the asset data or code encoded directly into the account profile record, the at least one alternate identifier representing an imprecise estimation of a match;

monitoring using the at least one alternate identifier or code and receiving, over the at least one communication interface, an asset data record indicative of a change in one or more encumbrances associated with one or more assets of the plurality of assets, the asset data record generated based on the ownership or security interest information for the one or more assets stored in the external database;

upon verification of the ownership or security interest information for the identified asset included in the registration request against the ownership or security interest information in the one or more database records accessed over the at least one communication interface, generating an enhanced data record as a data structure having extended dynamic data fields based on the verified asset data in the registration request, the enhanced data record including:

a second data record including a second principal parameter populated with a second credit amount and a credit rate parameter populated with a reduced credit rate, the second credit amount being based on the portion of the first credit amount associated with the identified asset in the verified asset data in the registration request; and the first data record with the first principal parameter adjusted based on the portion of the first credit amount included in the second data record, the first data record and the second data record coupled together using a pointer data object, the pointer data object utilized during automatic monitoring of a shared allocation between the first data record and the second data record;

wherein the enhanced data record, including the first data record and the second data record as the extended dynamic data fields, is processed by a downstream system as an encapsulated data package comprising instruction sets for provisioning of a product;

upon detecting an impairment trigger, modifying one or more data fields of the enhanced data record to adjust at least one of the parameters in the enhanced data record to encapsulate a corresponding change in risk level in the encapsulated data package;

generating one or more electronic signals for instructing an interface of a security registrar system for a recordal of the asset to be registered on the security registrar system based on the enhanced data record, wherein the recordal of the asset on the security registrar system is for effecting public notice of the recordal of the asset;

transmitting, over the at least one communication interface, said one or more electronic signals for instructing the interface of the security registrar system to effect the public notice of the recordal of the asset; and rendering, on the secure graphical interface, one or more graphical visual interface elements representing the extended dynamic data fields of the dynamically updated enhanced data record, the rendering triggered by the detection of the impairment trigger;

wherein the enhanced data record is maintained over a duration of time to dynamically size at least one of the first credit amount of the first data record or the second credit amount of the second data record based on the change in the one or more encumbrances indicated in the received asset data record; and wherein correlating at least the portion of the account profile record and the asset data with the one or more database records accessed over the at least one communication interface comprises:

extracting a subset of fields from the account profile record or the asset data, and generating a database record request based on the subset of fields; and upon receiving a response to the database record request indicating that the subset of fields is not correlated with a single record, extracting an additional subset of fields from the account profile record or the asset data, and generating a further database record request based on the additional subset.

* * * * *